(12) United States Patent
Chou et al.

(10) Patent No.: US 8,501,827 B2
(45) Date of Patent: Aug. 6, 2013

(54) METHODS FOR USING HOLLOW SPHERE POLYMERS

(75) Inventors: Chuen-Shyong Chou, Ambler, PA (US); John Robert Haigh, Roquefort les Pins (FR)

(73) Assignee: Rohm and Haas Company, Philadelphia, PA (US)

( * ) Notice: Subject to any disclaimer, the term of this patent is extended or adjusted under 35 U.S.C. 154(b) by 1575 days.

(21) Appl. No.: 11/500,696

(22) Filed: Aug. 8, 2006

(65) Prior Publication Data

US 2007/0043129 A1 Feb. 22, 2007

(30) Foreign Application Priority Data

Aug. 22, 2005 (EP) .................................. 05291765

(51) Int. Cl.
| | | |
|---|---|---|
| *B05D 3/06* | (2006.01) | |
| *B05D 3/02* | (2006.01) | |
| *C08J 9/32* | (2006.01) | |
| *C08J 9/18* | (2006.01) | |
| *C08J 9/28* | (2006.01) | |
| *C08L 83/00* | (2006.01) | |

(52) U.S. Cl.
USPC .............. 521/54; 427/557; 427/559; 521/60; 521/64; 521/76; 523/201

(58) Field of Classification Search
USPC ................ 428/402.2; 427/557, 559; 521/54, 521/60, 64, 76; 523/201; 525/902
See application file for complete search history.

(56) References Cited

U.S. PATENT DOCUMENTS

| | | | |
|---|---|---|---|
| 3,914,338 A | 10/1975 | Krieg et al. | |
| 4,103,050 A * | 7/1978 | Laskin et al. | 428/425.8 |
| 4,427,836 A * | 1/1984 | Kowalski et al. | 525/301 |
| 4,468,498 A | 8/1984 | Kowalski et al. | |
| 4,469,825 A | 9/1984 | Kowalski et al. | |
| 4,594,363 A | 6/1986 | Blankenship et al. | |
| 4,880,842 A | 11/1989 | Kowalski et al. | |
| 4,970,241 A | 11/1990 | Kowalski et al. | |
| 4,985,064 A | 1/1991 | Redlich et al. | |
| 5,041,464 A | 8/1991 | Hoshino et al. | |
| 5,135,568 A | 8/1992 | Fasano | |
| 5,157,084 A | 10/1992 | Lee et al. | |
| 5,216,044 A | 6/1993 | Hoshino et al. | |
| 5,494,508 A | 2/1996 | Vogel | |
| 5,494,971 A | 2/1996 | Blankenship | |
| 5,510,422 A | 4/1996 | Blankenship et al. | |
| 5,527,613 A | 6/1996 | Blankenship et al. | |
| 5,545,695 A | 8/1996 | Blankenship | |
| 5,639,805 A | 6/1997 | Park et al. | |
| 5,663,213 A | 9/1997 | Jones et al. | |
| 5,710,227 A | 1/1998 | Freeman et al. | |
| 6,020,435 A | 2/2000 | Blankenship et al. | |
| 6,045,871 A | 4/2000 | Matt et al. | |
| 6,046,278 A | 4/2000 | Freeman et al. | |
| 6,139,961 A * | 10/2000 | Blankenship et al. | 428/402 |
| 6,235,344 B1 | 5/2001 | Whiteman | |
| 6,252,004 B1 | 6/2001 | Blankenship et al. | |
| 6,384,104 B1 | 5/2002 | Chang et al. | |
| 2001/0009929 A1 | 7/2001 | Blankenship et al. | |
| 2001/0036990 A1 | 11/2001 | Bobsein et al. | |
| 2002/0001698 A1 | 1/2002 | Blankenship et al. | |
| 2002/0014318 A1 | 2/2002 | Bobsein et al. | |
| 2002/0028859 A1 | 3/2002 | Maeda | |
| 2002/0065360 A1 | 5/2002 | Blankenship | |
| 2002/0072560 A1 | 6/2002 | Bardman et al. | |
| 2002/0123425 A1 | 9/2002 | Bobsein et al. | |
| 2003/0129435 A1 | 7/2003 | Blankenship et al. | |
| 2003/0134949 A1 * | 7/2003 | Brown | 524/261 |
| 2003/0176535 A1 | 9/2003 | Chung et al. | |
| 2004/0034147 A1 * | 2/2004 | Zama | 524/460 |
| 2006/0046056 A1 * | 3/2006 | Brown et al. | 428/402.2 |

FOREIGN PATENT DOCUMENTS

| | | |
|---|---|---|
| EP | 0022633 | 1/1981 |
| EP | 022633 A | 1/1981 |
| EP | 0188325 | 7/1986 |
| EP | 1010706 | 6/2000 |
| EP | 1092421 | 4/2001 |
| EP | 1092421 A | 4/2001 |
| EP | 1344803 | 9/2003 |
| EP | 1344803 A | 9/2003 |
| JP | 7041700 A | 2/1995 |
| JP | 2000336318 A | 12/2000 |
| JP | 2002241448 A | 8/2002 |
| WO | WO 9404603 | 3/1994 |
| WO | 0110937 A1 | 2/2001 |
| WO | 9404603 | 10/2010 |

OTHER PUBLICATIONS

Supplemental Search Report of the European Patent Office in counterpart foreign Application No. 11189422.6-1217 dated Jan. 12, 2012, 6 pages.

* cited by examiner

*Primary Examiner* — David W Wu
*Assistant Examiner* — Elizabeth Eng
(74) *Attorney, Agent, or Firm* — Cantor Colburn LLP; Karl Stauss

(57) ABSTRACT

A method of using heat-resistant hollow sphere polymers having at least on crosslinked polymer stage, and having a core stage that has been swollen with a volatile base, in applications in which the hollow sphere polymer is exposed to temperatures of from 100° C. to 350° C., is provided. Articles made by the method are also provided.

8 Claims, No Drawings

METHODS FOR USING HOLLOW SPHERE POLYMERS

This patent application claims the benefit of the earlier filed European Patent application serial number 05291765.5 filed on Aug. 22, 2005 under 37 CFR 1.55(a).

The present invention relates to a method of using heat-resistant hollow sphere polymers having at least one crosslinked polymer stage, and having a core stage that has been swollen with a volatile base, in applications in which the hollow sphere polymers are exposed to temperatures of from 100° C. to 350° C.

Voided, or hollow polymeric particles are generally prepared by swelling a multi-stage polymer, having a core and a shell, in such a way that one or more voids form in the interior of the hollow polymeric particle. It is well known to use such hollow polymeric particles to provide favorable properties, such as brightness, whiteness, opacity, and/or low density. In many cases, the hollow polymeric particles are used to reduce the cost of the final product by replacing or extending white opacifying mineral pigments, some of which can be costly (for example, titanium dioxide). Hollow polymeric particles are often used in paints, coatings, inks, sunscreens, paper manufacture, and several other arenas. However, their use has tended to be limited to applications involving materials that are manufactured under mild temperature conditions because most hollow polymeric polymers collapse when the temperature gets too high. This is disadvantageous because, among other things, the distortion, or lack of the void, impairs the ability of the hollow sphere polymer to scatter light, and thus prevents the hollow sphere polymer from imparting, among other things, opacity.

There are a number of applications involving the high temperature processing of materials, that could benefit from the use of hollow polymeric particles, for example, in powder coating, plastic, metal coating, textile coating, nonwoven, and pigment printing applications. Thus, there is a need for a hollow sphere polymer that is able to provide improvements in opacity, even after exposure to high temperatures.

U.S. patent application Ser. No. 2003/0176535 discloses a heat-resistant ink containing a carrier liquid and hollow sphere polymer particles that are crosslinked. However, the patent application does not disclose use of the hollow microsphere polymer particles in materials other than ink, or in applications other than ink jet ink printing, thus, it does not disclose use of the polymers in applications where they are exposed to, for example, solvents, shear conditions, and/or higher temperatures than those encountered in ink jet printing, and the like.

Applicants have unexpectedly discovered that hollow sphere polymers having at least one crosslinked polymer stage, and having a core stage polymer that has been swollen by a volatile base are useful for providing at least one of, improved whiteness, brightness, opacity, or low density when used in applications in which the hollow sphere polymer is subjected to high temperatures, such as, for example powder coating, plastic, metal coating, textile coating, nonwoven, and pigment printing.

A first aspect of the present invention is a method of using a heat-resistant hollow sphere polymer, comprising the steps of: (a) providing a composition comprising a dispersion of hollow sphere polymers, wherein said hollow sphere polymer has at least one core stage and at least one shell stage, wherein said core stage has been swollen by a volatile base, and wherein at least one of said core stage and said shell stage is crosslinked; (b) performing at least one of (i) mixing said composition containing said hollow sphere polymer with a coating composition, (ii) mixing said composition containing said hollow sphere polymer with a thermoplastic, or (iii) contacting said composition containing said hollow sphere polymer with a substrate; and (c) exposing said composition containing said hollow sphere polymer to temperatures of from 100° C. to 350° C.

A second aspect of the present invention is an article formed by the method the invention.

We discovered that hollow sphere polymers having at least one crosslinked polymer stage, and having a core stage that has been swollen with a volatile base, are able to resist high temperatures. Thus, they can impart at least one of lightness, brightness, or opacity, to articles to which they are applied or incorporated. The method of the present invention is directed toward the use of such hollow sphere polymers in applications in which the hollow sphere polymer is exposed to temperatures of from 100° C. to 350° C.

The first step of the method is providing a dispersion of hollow sphere polymers whose cores have been swollen by a volatile base. In the preferred embodiment, the hollow sphere polymer dispersion has an amine titer, as determined by the "F Method" (described below) of at least 0.05 meq/g solid, preferably at least of at least 0.1 meq/g solid, more preferably greater than of 0.2 meq/g solid.

The "F Method" is as follows.

The F Method requires the following solvents and reagents: tetrahydrofuran, a 10 wt % aqueous stock solution of potassium chloride, 0.500+/−0.003 N aqueous potassium hydroxide solution, 0.5 N aqueous hydrochloric acid solution, a non-ionic surfactant with an HLB value of 17-18 (examples of non-ionic surfactants that can be used include Triton™ X-405 or Tergitol™ NP40 ethoxylated alkylphenols or Tergitol™ 15-S-40 $C_{12-14}$ secondary alcohol ethoxylate all manufactured by Dow Chemical, Midland, Mich.), a strong acid cation exchange resin in the fully protonated form having an exchange capacity of 4-5 meq/g on a dry weight basis (examples of resins that can be used include Amberlite™ IRN-77 strong acid cation exchange resin manufactured by the Rohm and Haas, Co, Philadelphia, Pa., or Dowex™ 50WX8 strong acid cation exchange resin manufactured by Dow Chemical, Midland, Mich.). Titration blanks should be conducted with all solvents and reagents to insure no interference from weakly acidic or weakly basic species. Interfering species, inhibitors or by-products of manufacture, can be removed from the tetrahydrofuran or the non-ionic surfactant, via ion-exchange with a mixed bed ion-exchange resin having a total exchange capacity of 1-5 meq/g on a dry weight basis (examples of mixed bed resins that can be used include Amberlite™ MB-3A monobed resin manufactured by Rohm and Haas, Co., Philadelphia, Pa. or Dowex™ MB-50 mixed bed resin manufactured by Dow Chemical, Midland, Mich.) the ion-exchange being conducted so that blank titrations are free from interference.

15 grams of hollow sphere dispersion is diluted with 15 grams of deionized water, 10 grams of solid strong acid ion-exchange resin (having an exchange capacity of 4-5 meq/g on a dry weight basis) is added (as supplied, strong acid ion-exchange resin usually contain some water—the resins do not need to be dried prior to use), the mixture is stirred for 60 minutes, and then the mixture is filtered through a 325 mesh stainless steel screen to remove the ion-exchange resin.

The mass solids content of the hollow sphere polymer dispersion or the material treated with strong ion-exchange resin is determined gravimetrically as follows. With an analytical balance, accurately weigh a sample, nominal weight 0.5 grams, into a tared aluminum weighing pan and dry for 30 minutes at 150° C. in a forced draft drying oven.

The amine titer, in meq/g solid, is determined from the difference in total titer determined in two titrations as follows.

A first titration is conducted on a sample of the original hollow sphere polymer dispersion (i.e., that has not been treated with strong ion-exchanged resin). An amount of the non-ionic surfactant (with an HLB value of 17-18) equivalent to 2 grams of active ingredient is added and mixed into an accurately measured amount of hollow sphere polymer dispersion that contains 0.6 grams of hollow sphere polymer solids. This mixture is diluted with 5 grams of a 10% aqueous solution of potassium chloride and 75 grams of tetrahydrofuran. The pH is adjusted to 2.5 or lower by dropwise addition of 0.5 N aqueous hydrochloric acid solution with mixing. A titration curve is generated by recording the pH as a function of the amount of 0.5 N aqueous potassium hydroxide base added; the base should be added in small enough increments so that a smooth titration curve is generated. Base addition should be continued until the measured pH is 13.5 or higher. The titration curve will have a first inflection point at approximately pH=5 and a final inflection point at approximately pH=12; there may be some intermediate inflection points as well. The first and last inflection points should be precisely located either via direct inspection of the titration curve or from peaks in a plot of the first derivative of the titration curve. The total titer, in meq/g solid, for the first titration is the milliequivalents of base required to go from the first to the last inflection point divided by the actual weight of hollow sphere polymer solid in the titration sample.

A second titration is conducted on a sample of the hollow sphere polymer dispersion treated with the strong acid cation exchange resin as described above. An amount of the non-ionic surfactant equivalent to 2 grams of active ingredient is added and mixed into an accurately measured amount of the treated hollow sphere polymer dispersion that contains 0.6 grams of hollow sphere polymer solids. This mixture is diluted with 5 grams of a 10% aqueous solution of potassium chloride and 75 grams of tetrahydrofuran. The pH is adjusted to 2.5 or lower by dropwise addition of 0.5 N aqueous hydrochloric acid solution with mixing. A titration curve is generated by recording the pH as a function of the amount of 0.5 N aqueous potassium hydroxide base added; the base should be added in small enough increments so that a smooth titration curve is generated. Base addition should be continued until the measured pH is 13.5 or higher. The titration curve will have a first inflection point at approximately pH=5 and a final inflection point at approximately pH=12; there may be some intermediate inflection points as well. The first and last inflection points should be precisely located either via direct inspection of the titration curve or from peaks in a plot of the first derivative of the titration curve. The total titer, in meq/g solid, for the second titration is the milliequivalents of base required to go from the first to the last inflection point divided by the actual weight of hollow sphere polymer solid in the titration sample.

The amine titer, in meq/gram solid, is the total titer determined in the first titration less the total titer determined in second titration.

In a preferred embodiment of the invention, the hollow sphere polymer has been made by forming a multi-stage polymer having a core stage that is encapsulated by a shell stage, and then swelling the multi-stage polymer by contacting it with a volatile base, to form the hollow sphere polymer. Hollow sphere polymers of this type are well known in the art, and commercially available.

The core stage polymer is an emulsion polymer that has been formed by polymerizing at least one mono-ethylenically unsaturated monomer containing acid functionality. The core stage polymer is prepared by emulsion homo-polymerization of the acid-containing monomer, or by co-polymerization of the acid-containing monomer with at least one different monomer. Suitable mono-ethylenicially unsaturated monomers containing acid functionality, useful for making the core stage polymer, include, for example, monomers containing at least one carboxylic acid group including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, and monomethyl itaconate; also contemplated is the use of terminally unsaturated acid-containing oligomers such as, for example, are taught in U.S. Pat. Nos. 5,710,227 and 6,046,278 and EP 1010706, and including comb/graft, block, and mixed block oligomers. The use of the term "(meth)" followed by another term such as acrylate, acrylonitrile, or acrylamide, as used throughout the disclosure, refers to both acrylate, acrylonitrile, or acrylamide and methacrylate, methacrylonitrile, and methacrylamide, respectively. Acrylic acid and methacrylic acid are preferred.

In general, core co-polymers containing at least about 5%, preferably at least 10%, by weight of the acid containing monomer have practical swellability for the purposes of the present invention. However, there may be instances where, because of the hydrophobicity of certain co-monomers, the co-polymer may require more, or less, than 5 weight percent of acid-containing monomer. As noted above, the core stage polymer may be formed by homo-polymerization of an acid-containing monomer. Thus, the invention includes a core containing 100% of the emulsion polymerized acid-containing monomer. A preferred maximum quantity of acid-containing monomer is about 70%, by weight, of the total core stage monomers.

In a preferred embodiment, the acid-containing monomer is co-polymerized with one or more nonionic mono-ethylenically unsaturated monomers. In one embodiment, the core stage polymer is formed by co-polymerizing from 5 to 100%, preferably from 20% to 60%, and more preferably, from 30% to 50%, by weight, based on the weight of the core stage polymer, of at least one ethylenicially unsaturated monomer containing acid functionality, and from 0 to 95% by weight, based on the weight of the core stage polymer, of at least one nonionic mono-ethylenically unsaturated monomer. Suitable nonionic mono-ethylenically unsaturated monomers for making the core stage polymer include styrene, α-methyl styrene, p-methyl styrene, t-butyl styrene, vinyltoluene, ethylene, vinyl acetate, vinyl chloride, vinylidene chloride, (meth)acrylonitrile, (meth)acrylamide, ($C_1$-$C_{20}$) alkyl or ($C_3$-$C_{20}$) alkenyl esters of (meth)acrylic acid, such as methyl (meth)acrylate, ethyl (meth)acrylate, butyl (meth)acrylate, 2-ethylhexyl (meth)acrylate, hydroxyethyl(meth)acrylate, hydroxypropyl(meth)acrylate, benzyl (meth)acrylate, lauryl (meth)acrylate, oleyl (meth)acrylate, palmityl (meth)acrylate, stearyl (meth)acrylate and the like.

The core stage polymer may optionally contain less than 20% by weight, preferably from 0.1 to 3% by weight, based on the total weight of the core, of polyethylenically unsaturated monomer, wherein the amount used is generally approximately directly proportional to the amount of mono-ethylenicially unsaturated acid-containing monomer used. In other words, as the relative amount of mono-ethylenically unsaturated acid-containing monomer increases, it is acceptable to increase the level of polyethylenically unsaturated monomer.

Alternatively, the core polymer may contain from 0.1 to 60% by weight, based on the total weight of the core polymer, of butadiene.

Suitable polyethylenically unsaturated monomers include co-monomers containing at least two addition polymerizable vinylidene groups and are alpha-beta ethylenically unsaturated monocarboxylic acid esters of polyhydric alcohols containing 2-6 ester groups. Such co-monomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of mono- and dicarboxylic acids having terminal ethylenic unsaturation including allyl (meth)acrylate, diallyl maleate, diallyl fumarate, diallyl itaconate and the like.

The shell stage of the hollow sphere polymer of this invention has a relatively moderate to high glass transition temperature (Tg). Preferably, the outermost shell stage polymer Tg is greater than 25° C., more preferably greater than 50° C., even more preferably greater than 70° C., and most preferably greater than 90° C., as calculated by the Fox Equation (T. G. Fox, Bull. Am. Physics Soc., Volume 1, Issue No. 3, page 123 (1956)). That is, for calculating the Tg of a co-polymer of monomers M1 and M2, $$1/Tg(\text{calc.}) = w(M1)/Tg(M1) + w(M2)/Tg(M2), \text{ wherein}$$

Tg(calc.) is the glass transition temperature calculated for the co-polymer w(M1) is the weight fraction of monomer M1 in the co-polymer w(M2) is the weight fraction of monomer M2 in the co-polymer Tg(M1) is the glass transition temperature of the homopolymer of M1

Tg(M2) is the glass transition temperature of the homopolymer of M2, all temperatures being in °K.

The shell stage polymer preferably has a particle size of from 0.2 microns to 2 microns, more preferably from 0.3 microns to 1 microns, even more preferably from 0.35 microns to 0.6 microns.

The shell stage polymer is the product of emulsion polymerizing a shell stage monomer system in the presence of the core stage polymer. The monomers used, and the relative proportions thereof in the shell stage polymer, should be such that the shell stage polymer permits permeation of a volatile base. It is preferred that the shell stage monomer system be all acrylic. However, in a particularly preferred embodiment, the shell stage polymer contains as co-polymerized units, butyl methacrylate, methyl methacrylate, and from about 1 to about 10% by weight methacrylic acid.

In one embodiment of the invention, the core stage polymer contains co-polymer, having as co-polymerized units from 5 to 100%, based on the weight of the core stage polymer, of at least one ethylenically unsaturated monomer containing acid functionality, and from 0 to 95% by weight, based on the weight of the core stage polymer, of at least one nonionic mono-ethylenically unsaturated monomer; and the shell stage polymer is formed by polymerizing from about 90% by weight to about 99.9%, by weight, based on the total weight of shell stage polymer, of at least one nonionic mono-ethylenically unsaturated monomer, and from about 0.1% by weight to about 10% by weight, based on the total weight of shell stage polymer, of an acid-functional mono-ethylenically unsaturated monomer. In this embodiment, when the particle size of the core stage polymer is from about 130 nm to about 1.0 microns, the acid-functional mono-ethylenically unsaturated monomer is preferably added to the polymerization of the shell stage polymer over 100% of the total shell stage monomer feed, based on the total weight of the shell stage monomer feed, more preferably over the first 50% of the feed, even more preferably over the first 25% of the feed, and most preferably over the first 10% of the feed. When the particle size of the core stage polymer is less than about 130 nm, the acid-functional mono-ethylenically unsaturated monomer is preferably added to the polymerization of the shell stage polymer over the first 50% of the total shell stage monomer feed, based on the total weight of the shell stage monomer feed, more preferably over the first 25% of the feed, and most preferably over the first 10% of the feed.

The hollow sphere polymer system may contain a shell stage monomer system containing at least 1% by weight acid functional monomer, the balance of which may be a nonionic mono-ethylenically unsaturated co-monomer, such as those mentioned herein-above for the core stage polymer. The preferred amount of acid functional monomer in the monomer system used to prepare the shell stage polymer is from 5 to 10% by weight when solvent is not used, and from about 1 to 2% by weight when solvent is used. Alternatively, the hollow sphere polymer system may involve the swelling of the hollow sphere polymer in the presence of a solvent.

The use of solvent assists in the penetration of the shell by the volatile base. Suitable amounts of solvent are from 1 to 100 parts by weight, based on 100 parts by weight hollow sphere polymer, preferably from 5-10 parts by weight. Suitable solvents are any which will plasticize the shell, for example, hexanol, ethanol, 3-hydroxy-2,2,4-trimethylpentyl isobutyrate, toluene, mixtures of solvents, and the like. The solvent can be added either before, after, or with the addition of the base. In certain cases the shell stage monomer system itself can function as the solvent for the shell stage polymer.

As noted herein-above, Applicants have unexpectedly discovered that hollow sphere polymers that having at least one crosslinked polymer stage, and having a core stage polymer that has been swollen by a volatile base, are able to withstand temperatures of from 100° C. to 350° C. Preferably the polymer stage that is crosslinked is the shell stage polymer. Crosslinking may occur during polymerization to form the core and/or shell stage polymer, after polymerization to form the core and/or shell stage polymer, or a combination thereof.

The crosslinking level is preferably from 2 mole % to 70 mole %, more preferably from 5 mole % to 50 mole %, based on the total mole of monomer used in the hollow sphere polymer. Crosslinking in the shell can be derived from the use of one or more polyethylenically unsaturated monomers. Suitable polyethylenically unsaturated monomers include those described herein-above for the core and shell stage polymers. Alternatively, crosslinking of the shell stage polymer may be derived from the use of one or more multifunctional monomers, to provide post-polymerization crosslinking of the shell. The multi-functional monomers contain at least one functional group capable of vinyl-copolymerization, and at least one functional group capable of reaction with suitable reactive molecules. Suitable reactive molecules include, for example, amines, diamines, amino acids and aminoalkyltialkoxysilanes; optionally followed by the addition of other reactive molecules, such as aldehydes (for example, formaldehyde) dialdehydes (for example, glutaric dialdehyde), hydrazines and dihydrazines (for example, succinic dihydrazine) to form post-polymerization crosslinked sol-gels. Examples of suitable functional groups and reactive molecules for post-polymerization crosslinking of the shell stage polymer, as well as multi-functional monomers suitable for post-polymerization crosslinking, are illustrated, without limitation, in European Patent Application EP 1092421. Preferred crosslinkers include divinyl benzene, allyl methacrylate and acetoacetoxy ethyl methacrylate.

Within the scope of the invention are, among others, shell stage polymers which completely encapsulate the core stage polymer; shell stage polymers which substantially, but incompletely encapsulate the core stage polymer; polymers that are swollen to provide a particle with at least one pore communicating between the surface of the particle and the interior, (i.e. core or void), of the particle; polymer particles having multiple cores; multistaged polymers wherein the core polymer is a precursor to the acid-functionality containing core polymer of this invention and is subsequently converted to the acid-functionality containing core polymer of this invention by means such as hydrolysis of the core polymer according to the teachings of U.S. Pat. Nos. 5,041,464; 5,157,084; and 5,216,044, whether before, during, or after shell polymer formation, and the core polymer is contacted with a volatile base, during or after the hydrolysis.

The multi-stage polymer particles containing the core and shell stage polymers are prepared by sequential emulsion polymerization methods, which are well known in the art, for example as described in U.S. Pat. No. 4,594,363. By "sequential emulsion polymerization" is meant herein that the homo- or co-polymers of one stage of the polymer are prepared in aqueous medium, by an emulsion polymerization process, in the presence of the dispersed polymer particles of a polymer stage previously formed by emulsion polymerization, such that the previously formed emulsion polymers are increased in size by deposition thereon of emulsion polymerized product of one, or more, successive monomer charges that are introduced into the medium containing the dispersed particles of the pre-formed emulsion polymer. Each stage of the hollow sphere polymer may be made in a single stage, or step, of the sequential polymerization, or may be made by a plurality of steps in sequence.

The sequential emulsion polymerization may involve use of a seed polymer. The term "seed" polymer is used to refer to an aqueous emulsion polymer dispersion, which may be the dispersion containing the first-formed polymer stage, or it may be the emulsion polymer dispersion obtained at the end of any subsequent stage, except the final stage of the sequential polymerization. Thus, a core stage polymer which is intended to be encapsulated by one, or more, subsequent stages of emulsion polymerization, may itself be termed a seed polymer for the next stage. Likewise, a seed polymer may be utilized to form the nuclei on which the core stage polymer is formed.

A water-soluble free radical initiator may be utilized in the aqueous emulsion polymerization. Suitable water-soluble free radical initiators include hydrogen peroxide; tert-butyl peroxide; alkali metal persulfates such as sodium, potassium and lithium persulfate; ammonium persulfate; and mixtures of such initiators with a reducing agent. Reducing agents include: sulfites, such as alkali metal metabisulfite, hydrosulfite, and hyposulfite; sodium formaldehyde sulfoxylate; and reducing sugars such as ascorbic acid and isoascorbic acid. The amount of initiator is preferably from 0.01 to 3% by weight, based on the total amount of monomer, and in a redox system the amount of reducing agent is preferably from 0.01 to 3% by weight based on the total amount of monomer. The initiation temperature may be in the range of from about 10° C. to about 100° C. In the case of the persulfate systems, the temperature is preferably in the range of from 60° C. to 90° C. In the redox system, the temperature is preferably in the range of from 30° C. to 70° C. The type and amount of initiator may be the same or different in the various stages of the multi-stage polymerization.

One or more nonionic or anionic emulsifiers, or surfactants, may be used, either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl) phenoxypoly(20) ethoxyethanol, hydroxyethylcellulosepolybutyl acrylate graft co-polymer, poly(ethylene oxide)poly (butyl acrylate) block co-polymer, block co-polymers of propylene oxide and ethylene oxide, 2,4,7,9-tetramethyl-5-decyne-4,7-diol ethoxylated with 30 moles of ethylene oxide, N-polyoxyethylene(20)lauramide, N-lauryl-N-polyoxyethylene(3)amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1) ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$)sulfonate, sulfates of hydroxyalkanols, tetrasodium N-(1,2-dicarboxy ethyl)-N-octadecylsulfo-succinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39) ethoxyethyl sulfate. The surfactant is generally used at a level of from 0 to 3% based on the weight of the multi-stage polymer. The surfactant can be added prior to the addition of any monomer charge, during the addition of a monomer charge, or a combination thereof. In certain monomer/emulsifier systems for forming the shell, the tendency to produce gum or coagulum in the reaction medium may be reduced or prevented by the addition of about 0.05% to about 2.0% by weight, based on total weight of the shell polymer, of emulsifier, without detriment to the deposition of the polymer formed on the previously formed core particles.

Carrying out the emulsion polymerization while maintaining low levels of emulsifier aids in the control of the number of micelles formed during the various stages of polymerization, facilitating the deposition of subsequent stages of polymer formation on the existing dispersed polymer particles resulting from the preceding step or stage. As a general rule, the amount of emulsifier should be kept below that corresponding to the critical micelle concentration for a particular monomer system, but while this limitation is preferable and produces a unimodal product, it has been found that in some systems the critical micelle concentration of the emulsifier may be exceeded somewhat without the formation of an objectionable or excessive number of dispersed micelles or particles.

The viscosity-average molecular weight of the polymer formed in a given stage may range from 100,000 to several million molecular weight. Where a chain transfer agent is used, the molecular weight can be lower than 100,000. When 0.1% by weight to 20% by weight, based on the weight of the monomer, of a polyethylenically unsaturated monomer is used in making the core, the molecular weight is increased whether or not crosslinking occurs. The use of the polyethylenically unsaturated monomer reduces the tendency of the core polymer to dissolve when the multistaged polymer is treated with a swellant for the core. If it is desired to produce a core having a molecular weight in the lower part of the range, such as from 500,000 down to as low as about 20,000, it is frequently most practical to do so by avoiding the polyethylenically unsaturated monomers and using a chain transfer agent, such as for example, alkyl mercaptans, such as sec-butyl mercaptan, instead, preferably in quantities of from 0.05 wt % to 2 wt % by weight, or more, based on the weight of total monomer.

The amount of polymer deposited to form the shell stage polymer is generally sufficient to provide an overall size of the multistage polymer particle of from 70 nm to 4.5 microns, preferably from 100 nm to 3.5 microns, more preferably from 200 nm to 2.0 microns, in unswollen condition, whether the shell polymer is formed in a single stage, or in a plurality of stages. In order to minimize the dry density of the final product, it is preferable to deposit only as much shell polymer as is needed to fully encapsulate the core.

The multi-stage polymer containing the core and shell stage polymers is swollen when the particles are subjected to a volatile base capable of swelling the core, resulting in the formation of the hollow sphere polymer. Preferably, the resulting hollow sphere polymer has a void fraction of from 20% to 70%, preferably 30% to 55%. By "void fraction" is meant herein the volume of the void within the polymer particle, divided by the total volume of the voided polymer particle. The swelling, or expansion, of the core may involve partial merging of the outer periphery of the core into the pores of the inner periphery of the shell and/or partial enlargement or bulging of the shell and the entire particle overall. Suitable swelling agents are those volatile bases which, in the presence of the multistage emulsion polymer, are capable of permeating the shell and swelling the core. By "volatile" is meant herein a base that evaporates from the emulsion either at ambient temperatures or upon drying. The volatile bases typically have a pKb<7 (in water at 25° C.). Suitable volatile bases include, for example, such as ammonia, ammonium hydroxide, amines, and the like. The volatile base differs from fixed or permanent bases, such as metal hydroxide such as, for example, sodium hydroxide, potassium hydroxide, lithium hydroxide, strontium hydroxide, barium hydroxide, which do not evaporate at ambient temperatures. Solvents, such as, for example, ethanol, hexanol, octanol, Texanol™ solvent (manufactured by Eastman Chemical Company, Kingsport, Tenn.), and those described in U.S. Pat. No. 4,594,363, may be added to aid in volatile base penetration.

The composition of the present invention is either (i) mixed with a coating composition, (ii) mixed with a thermoplastic composition, (iii) contacted with a substrate, or a combination thereof. The composition containing the hollow sphere polymer is then exposed to a temperature from 100° C. to 350° C., preferably from 120° C. to 350° C., more preferably from 125° C. to 350° C. The time during which the exposure occurs depends upon the temperature of the exposure, and the particular end-use. Likewise, the exposure temperature depends on the exposure duration and the end-use.

Exposure of the composition to temperatures of from 100° C. to 350° C. effects partial or complete drying, and where a curable composition is used, it effects partial or complete drying or drying and curing. The duration, and temperature, of the exposure will affect, among other things, the rate of drying, ease of processing or handling, and property development of the substrate that has been contacted by the composition. The drying and curing functions can be effected in two or more distinct steps, if desired. For example, the curable composition can be first heated at a temperature, and for a time, sufficient to substantially dry, but not to substantially cure the composition, and then heated for a second time, at a higher temperature, and/or for a longer period of time, to effect curing. Such a procedure, referred to as "B-staging", can be used to provide materials which can be cured at a later stage, with or without forming or molding into a particular configuration concurrent with the curing process.

In one embodiment of the invention, the composition containing the hollow sphere polymers is used in a powder coating. By "powder coatings" is meant herein coatings that are formed by application of a powder material to a substrate, for example, by an electrostatic or compressed air method, followed by heating to the powder material's melting point, causing it to flow to form a film. In this embodiment of the invention, the composition containing the hollow sphere polymer may be mixed with either a liquid powder coating composition, or dry powder coating powder. The hollow sphere polymer-containing composition may be dried, for example by spray drying, before, or after mixing with the powder coating. Where at least one of the mixture components is a liquid, the mixture may be dried, extruded, and then crushed and/or ground to form a powder. After mixing with the powder coating composition, the hollow sphere polymer-containing composition is contacted with a substrate, as described herein-above, and subjected to temperatures of from 100° C. to 240° C., preferably 100° C. to 180° C., more preferably from 120° C. to 180° C. Where the powder coating is a thermal cured powder coating, the temperature to which the composition is subjected is preferably from 120° C. to 240° C., preferably from 160° C. to 200° C. Where the powder coating is a thermoplastic powder coating, the temperature is preferably from 100° C. to 240° C., more preferably from 100° C. to 160° C., and even more preferably from 120° C. to 140° C. Where the powder coating is a UV cured powder coating, the temperature is preferably from 100° C. to 200° C., more preferably from 1000 to 150° C.

In another embodiment of the invention, the composition containing hollow sphere polymers is used in a plastic. The composition containing the hollow sphere polymer may be dried, for example by spray drying, and then mixed with either a dry, or liquid thermoplastic composition. In the former case, the mixture may be extruded or injection molded with the thermoplastic composition, and subjected to heat. The mixture may be dried prior to extrusion or injection molding. By "thermoplastic composition" is meant herein, a material that becomes soft when heated, and hard when cooled. Suitable thermoplastic compositions include, for example, polyethylene, polyvinyl chloride, polystyrene, and the like. Alternatively, the liquid composition containing the hollow sphere polymer may be mixed with either a liquid, or dry thermoplastic composition. In either case the mixture may be dried prior to extrusion, and exposure to temperatures of from 150° C. to 250° C., preferably from 170° C. to 210° C.

In yet another embodiment of the invention, the composition containing the hollow sphere polymer is used in metal coatings, such as coil coatings, can coatings, automotive coatings, industrial metal finishes, and the like. By "coil coatings" is meant herein coatings that are formed on an unwound metal coil, and then cured. By "can coatings" is meant herein coatings applied to metal either before or after the metal sheet is transformed into a can, for example cans used to contain food, beverages, aerosols and the like. The composition containing the hollow sphere polymer is mixed with the coil coating composition, contacted with the metal coil coating substrate, and then exposed to temperatures of from 150° C. to 350° C. With regard to coil coatings, the time during which the exposure takes place is typically from 30 seconds to 2 minutes, although in some circumstances, it may be longer. During the exposure, the metal upon which the composition is applied attains a peak metal temperature of from 150° C. to 250° C., preferably from 160° C. to 230° C. By "peak metal temperature" is meant herein, the maximum temperature reached by the surface of the coated metal upon exposure to high temperature, for example, in an oven. With regard to can coatings, the time during which the exposure takes place is typically from 1 minute to 10 minutes, although in some circumstances, it may be longer. During the exposure, the metal upon which the composition is applied attains a peak metal temperature of from 150° C. to 230° C., preferably from 160° C. to 200° C. With regard to industrial metal finishes, and automotive coatings, the time during which the exposure takes place is typically from 5 minutes to 20 minutes, although in some circumstances, it may be longer. Typical exposure temperatures for industrial metal finishes, and automotive coatings are from 120° C. to 200° C., preferably from 140° C. to 180° C.

In those embodiments of the invention in which the hollow sphere polymer-containing composition is contacted with a substrate, the methods by which the contact is made include, for example, coating, including, for example, roll coating, curtain coating, and air or airless spraying; sizing; padding; saturating; bonding; beater deposition; coagulation, combinations thereof, and the like. Thus, the composition may be located on or within the substrate, or a combination thereof.

The following examples illustrate specific aspects and particular embodiments of the invention which, however, in not to be construed as limited thereby.

Hollow Sphere Polymer Performance For Powder Coating

EXAMPLES 1-3

To demonstrate that the crosslinked hollow sphere polymers of the invention provide improved opacity in powder coatings, under typical high temperature curing conditions, hollow sphere polymer emulsions Ropaque™ AF 1055, a hard-base swollen hollow sphere polymer (Comparative Example 1), Ropaque™ AF 1055 with 5% divinyl benzene (DVB) (Comparative Example 2), and Sunspheres™ LCG, a volatile base-swollen, crosslinked hollow sphere polymer (Example 3), were blended with powder coating Vedoc™ Acrylic Clear Powder Topcoat (manufactured by Rohm and Haas Company, Philadelphia, Pa.), and applied over black float glass, with a 200 μm opening draw down blade. The resulting coatings were cured for 10 minutes in an air circulating oven, at 180° C. The reflectance of the resulting coatings was measured using a Byk Gardner reflectometer (angle 45/0).

TABLE 1

|  | Comp. Example 1 | Comp. Example 2 | Example 3 |
| --- | --- | --- | --- |
| Hollow sphere polymer (HSP) | Ropaque ™ AF 1055 | Crosslinked Ropaque ™ AF 1055 | Sunspheres ™ LCG |
| HSP swelling base | fixed | fixed | volatile |
| Opaque polymer solids | 26.5% | 26.5% | 27% |
| Quantities (g): |  |  |  |
| Hollow Sphere Polymer | 55 | 55 | 55 |
| Vedoc ™ Acrylic Topcoat | 25 | 25 | 25 |
| Total | 80 | 80 | 80 |
| Final solids | 49.4% | 49.4% | 49.8% |
| Reflectance after cure | 5.3 | 9.3 | 74.1 |

Hollow Sphere Polymer Performance for Coil Coating

EXAMPLES 4-7

To demonstrate that hollow sphere polymers of the invention provide improved opacity in coil coatings, and thus can coatings, under high temperature cure conditions, in the presence of coalescents, hollow sphere polymers Ropaque™ AF 1055 (Comparative Example 5), Ropaque™ AF 1055 with 5% DVB (Comparative Example 6), and Sunspheres™ LCG (Example 7), were screened in a waterborne acrylic coil coating formulation. The reference sample (Comparative Example 4), contained only TiO2 as pigment. The TiO2 slurry was made by dispersing the TiO2 with a Cowles disperser at high speed (1000 rpm) for 20 minutes in the formulation given below.

TABLE 2

| TiO2 Slurry Composition | Function | Weight |
| --- | --- | --- |
| Orotan ™ 165 | Dispersant | 7.04 |
| Triton ™ CF 10 | Wetting agent | 0.91 |
| Tegofoamex ™ K1488 | Defoamer | 0.7 |
| Ti-Pure ™ R706 | Pigment | 78.3 |
| Water |  | 13.05 |
| Total weight |  | 100 |

NOTE:
Orotan ™ 165 is manufactured by Rohm and Haas Company, Philadelphia, Pennsylvania.
Tegofoamex ™ K1488 is manufactured by Tego Chimie, Essen, Germany.
Ti-Pure ™ R706 is manufactured by DuPont, Wilmington, Delaware.

The four compositions were applied over black float glass using a draw down bar with a 100 μm opening. The samples were dried in an air circulating oven for three minutes at temperatures ranging from 100 to 220° C. After cooling to room temperature the opacity of the films was determined by measuring the reflectance with a Byk Gardner reflectometer (angle 45/0). The resulting opacities are given below:

TABLE 3

|  |  | Comp. Example 4 | Comp. Example 5 | Comp. Example 6 | Example 7 |
|---|---|---|---|---|---|
|  | Hollow sphere polymer (HSP): | TiO$_2$ (g) | Ropaque ™ AF 1055 (g) | Crosslinked Ropaque ™ AF 1055 (g) | Sunspheres ™ LCG (g) |
|  | HSP swelling base: | — | fixed | fixed | volatile |
| Compositions | Function |  |  |  |  |
| TiO2 Slurry at 78% solids | Pigment | 79.25 | 0 | 0 | 0 |
| Hollow Sphere Polymer | Pigment | 0 | 79.25 | 79.25 | 79.25 |
| Rhoplex ™ AC 3094 | Binder | 138.5 | 138.5 | 138.5 | 138.5 |
| Cymel ™ 303 | Binder | 9.25 | 9.25 | 9.25 | 9.25 |
| Dowanol ™ PnB | Coalescent | 7.5 | 7.5 | 7.5 | 7.5 |
| Arcosolv ™ DPM | Coalescent | 4.25 | 4.25 | 4.25 | 4.25 |
| Surfynol ™ TM 104E | Wetting agent | 1.5 | 1.5 | 1.5 | 1.5 |
| Sodium Nitrite at 15% | Anti flash rust | 4.25 | 4.25 | 4.25 | 4.25 |
| Water |  | 4 | 4 | 4 | 4 |
| Acrysol ™ RM 8W | Rheology control | 0.50 | 0.50 | 0.50 | 0.50 |
| Di-methyl amino ethanol | Base | 1.00 | 1.00 | 1.00 | 1.00 |
| Total Weight g's |  | 250 | 250 | 250 | 250 |

| Drying conditions (° C.) for 3 minutes | Opacity (reflectance) after drying | | | |
|---|---|---|---|---|
| 100 | 83 | 13 | 34.2 | 35.55 |
| 120 | 81.3 | 13.15 | 26.5 | 35.67 |
| 140 | 82.5 | 9.55 | 20.9 | 42.83 |
| 160 | 80 | 7 | 19.3 | 34.8 |
| 180 | 82 | 4.9 | 14.1 | 32.6 |
| 200 | 81.4 | 6.4 | 11.35 | 28.85 |
| 220 | 82.2 | 4.6 | 10.3 | 29.12 |

NOTE:
Rhoplex ™ AC 3094, Surfynol ™ TM 104E, and Acrysol ™ RM 8W are manufactured by Rohm and Haas Company, Philadelphia, Pennsylvania
Cymel ™ 303 is manufactured by Cytec Industries, West Paterson, New Jersey.
Dowanol ™ PnB is manufactured by Dow Chemical, Midland, Michigan.
Arcosolv ™ DPM is manufactured by Lyondell, Rotterdam, Netherlands.
Under industrial coil coating conditions, the air temperatures are higher but the residence time in the oven is short such that the peak metal temperature achieved is typically in the range 180 to 220° C..

Hollow Sphere Polymer Performance for Plastic

EXAMPLE 8

Solid particles of crosslinked volatile base-swollen hollow sphere polymers HSP1 and HSP2 were melt processed, at 180° C., into various polyvinyl chloride (PVC) formulations on a Haake Rheocord bowl. One inch square-⅛ inch thick plaques of the hollow sphere polymer-containing PVC were pressed using a vise-grip tool. Some of the specimens were cryofractured under liquid nitrogen. The fracture surface was examined by scanning electron microscopy (SEM) to determine the morphology of the melt processed hollow sphere polymers. The SEM photographs showed that the HSP1 and HSP2 particles did not collapse in the Haake bowl melt processing experiments, with any of the PVC formulations tested. The SEM photos showed well dispersed, uncollapsed, undistorted, and unfractured HSP1 and HSP2 particles in the bulk of the PVC matrix. In a clear PVC formulation, the HSP1 and HSP2 modified samples were very opaque.

The rest of the specimens were extracted with cyclohexanone to dissolve the PVC, enabling recovery of the HSP1 and HSP2 particles from the melt processed specimens. To confirm that the particles were still hollow, they were placed in liquid nitrogen and ground using a mortar and pestle. The surface of the particles were examined by SEM, which confirmed that the particles remained hollow. A summary of the experiment is given in Table 6.

EXAMPLE 9

Solid particles of crosslinked volatile base-swollen hollow sphere polymers HSP1, HSP2 were extruded into 2 inch wide-1/16 inch thick strips. Some of the specimens were cryofractured under liquid nitrogen. The fracture surface was examined by SEM to determine the morphology of the extruded hollow sphere polymers. The SEM photographs showed that the HSP1 and HSP2 did not collapse in the extrusion experiments, with any of the PVC formulations tested. The SEM photos showed well dispersed, uncollapsed, undistorted, and unfractured HSP1 and HSP2 particles in the bulk of the PVC matrix. In a clear PVC formulation, the HSP1 and HSP2 modified samples were very opaque.

The rest of the specimens were extracted with cyclohexanone to dissolve the PVC, enabling recovery of the HSP1 and HSP2 particles from the extruded specimens. To confirm that the particles were still hollow, they were placed in liquid nitrogen and ground using a mortar and pestle. The surface of the particles were examined by SEM, which confirmed that the particles remained hollow. A summary of the experiment is given in Table 6.

COMPARATIVE EXAMPLE 10

The melt processing, cryofracturing, and SEM examination described in Example 8 were repeated using uncrosslinked volatile base-swollen hollow sphere polymer, Ropaque™ HP1055, (manufactured by Rohm and Haas Company, Philadelphia, Pa.), in place of HSP1 and HSP2.

The SEM photographs showed that the Ropaque™ HP1055 hollow sphere polymers completely collapsed during melt processing, and the specimens were not very opaque. A summary of the experiment is given in Table 6.

COMPARATIVE EXAMPLE 11

The extruding method described in Example 9 was repeated using a clear PVC formulation containing no hollow sphere polymer. The extruded PVC remained clear, as described in Table 6.

TABLE 4

| Hollow Sphere Polymer | Particle Size (nm) | Void % | Void Size (nm) | % Crosslinker in Shell |
|---|---|---|---|---|
| HSP1 | 350 | ~30% | ~230 | 30% divinyl benzene |
| HSP2 | 585 | ~40% | ~431 | 30% divinyl benzene |

TABLE 5

| Ingredient | Type | Manufacturer | Parts per Hundred Parts Resin |
|---|---|---|---|
| Formulation A | | | |
| Borden ™ DCP-59 PVC (K-59) | PVC | PolyOne Corporation (Avon Lake, Ohio) | 100 |
| Advastab ™ TM-181 | Thermal stabilizer | Rohm and Haas Company (Philadelphia, Pennsylvania) | 1.5 |
| Aldo ™ MS (glycerol monostearate) | Wax/lubricant | Lonza Inc. (Allendale, New Jersey) | 0.5 |
| Licowax ™ OP | Wax/lubricant | Clariant Corporation, (Charlotte, North Carolina) | 0.2 |
| Paraloid ™ K-120ND | Processing aid | Rohm and Haas Company (Philadelphia, Pennsylvania) | 1 |
| Toner | Dye | Pfaltz and Bauer (Waterbury, Conneticut) | 0.0006 |
| TiO2 | Opacifier | Dupont Company, (Wilmington, Delaware) | Variable |
| CaCO3 | Opacifier | Omya (Florence, Vermont) | Variable |
| Formulation B | | | |
| Geon ™ 103 EPF PVC | PVC | PolyOne Corporation (Avon Lake, Ohio) | 100 |
| Advastab ™ TM-181 | Thermal stabilizer | Rohm and Haas Company (Philadelphia, Pennsylvania) | 1.6 |
| Calcium Stearate (regular white) | Lubricant | Crompton (Middlebury, Connecticut) | 1.3 |
| Licolub ™ XL-165 wax | Wax/lubricant | Clariant Corporation (Charlotte, North Carolina) | 1 |
| Paraloid ™ K-120N | Processing Aid | Rohm and Haas Company (Philadelphia, Pennsylvania) | 0.5 |
| Paraloid ™ K-175 | Processing Aid | Rohm and Haas Company (Philadelphia, Pennsylvania) | 1 |
| TiO2 Zopaque ™ R C14 | Opacifier | Millenium Chemicals (Hunt Valley Maryland) | 10 |
| Formulation C | | | |
| Geon ™ SPVC K68 | PVC | PolyOne Corporation (Avon Lake, Ohio) | 100 |
| Naftovin ™ T90 | Thermal stabilizer | Chemson (Arnoldstein, Austria) | 3 |
| Listab ™ 51 | Thermal stabilizer | Chemson (Arnoldstein, Austria) | 0.3 |
| Listab ™ 28 | Thermal stabilizer | Chemson (Arnoldstein, Austria) | 0.7 |
| Ceasit ™ 1 | Lubricant | SpecialChem (Paris, France) | 0.3 |
| Loxitol ™ G61 | Lubricant | Rohm and Haas Company (Philadelphia, Pennsylvania) | 0.4 |
| Loxiol ™ G32 | Lubricant | Rohm and Haas Company (Philadelphia, Pennsylvania) | 0.5 |
| A-C ™ 307A | Wax/lubricant | Honeywell, (Morristown, New Jersey) | 0.05 |
| Paraloid ™ K175 | Processing Aid | Rohm and Haas Company (Philadelphia, Pennsylvania) | 0.5 |
| Calcium carbonate | Opacifier | Dupont Company (Wilmington, Delaware) | 5 |
| TiO2 | Opacifier | Omya (Florence, Vermont) | 4 |
| Opacifier | | | Variable |

TABLE 6

| Eg. | Hollow Sphere Polymer | Formulation | % HSP in formulation | Processing | Treatment | Results & SEM |
|---|---|---|---|---|---|---|
| C11 | — | A | — | Extruder | None | Clear |
| 8A | HSP1 | A | 10% | Haake | Cryofractured in N2 | Very opaque/uniform particles |
| 8B | HSP1 | C | 10% | Haake | Cryofractured in N2 | Very opaque/uniform particles |
| 8C | HSP1 | B | 10% | Haake | Cryofractured in N2 | Very opaque/uniform particles |
| 8D | HSP2 | A | 10% | Haake | Extraction of PVC with cyclohexanone | Slightly distorted particles |
| C10 | HP1055 | A | 10% | Haake | Cryofractured in N2 | Not opaque/collapsed particles |
| 9A | HSP1 | A | 10% | Extruder | Cryofractured in N2 | Opaque/uniform particles |
| 9B | HSP1 | A | 10% | Extruder | Extraction of PVC with cyclohexanone | Uniform particles |
| 9C | HSP2 | A | 10% | Extruder | Cryofractured in N2 | Opaque/slightly distorted particles |

We claim:

1. A method of using a heat-resistant hollow sphere polymer, comprising the steps of:
   (a) providing a composition comprising a dispersion of hollow sphere polymers, wherein said hollow sphere polymer has at least one core stage and at least one shell stage,
   wherein said core stage has been swollen by a volatile base, and
   wherein at least one of said core stage and said shell stage is crosslinked;
   (b) mixing said composition containing said hollow sphere polymers with a thermoplastic to form a thermoplastic composition comprising the hollow sphere polymers, and extruding or injection molding said thermoplastic composition comprising the hollow sphere polymers; and
   (c) exposing said composition from step (b) containing said hollow sphere polymers to a temperature of from 100° C. to 350° C.

2. The method of claim 1, wherein said composition containing said dispersion of said polymers hollow sphere is dried prior to mixing with said thermoplastic.

3. The method of claim 1, wherein said composition containing said dispersion has an amine titer, as determined by the F Method, of at least 0.05 meq/g solid.

4. The method of claim 1, wherein said crosslinking is at a level of from at least 2 mole percent, based on total mole of monomer used in said hollow sphere polymer.

5. The method according to claim 1, wherein said hollow sphere polymer is made by:
   i. forming a core stage polymer by polymerizing at least one mono-ethylenically unsaturated monomer containing acid functionality,
   ii. encapsulating said core stage polymer with at least one shell stage polymer, by emulsion polymerizing at least one shell stage monomer system in the presence of said core stage polymer,
       wherein said shell stage polymer permits penetration of a volatile base,
   iii. contacting the resulting multi-stage polymer particles with a volatile base, wherein either (1) said shell stage polymer comprises at least 1% acid functional monomer, or (2) said contacting takes place in the presence of a solvent.

6. The method, according to claim 5, wherein said core stage polymer is formed by polymerizing from about 5% by weight to about 100% by weight, based on the total weight of core stage polymer, of said mono-ethylenically unsaturated monomer containing acid functionality, and from 0% by weight to about 95% by weight, based on the total weight of core stage polymer, of at least one nonionic mono-ethylenically unsaturated monomer;
   wherein said shell stage polymer is formed by polymerizing from about 90% by weight to about 99.9% by weight, based on the total weight of shell stage polymer, of at least one nonionic mono-ethylenically unsaturated monomer, and from about 0.1% by weight to about 10% by weight, based on the total weight of shell stage polymer, of an acid-functional mono-ethylenically unsaturated monomer; and wherein said acid-functional mono-ethylenically unsaturated monomer is added to the polymerization of said shell stage polymer throughout 100% of the total shell stage monomer feed based on the total weight of the shell stage monomer feed, when the particle size of said core stage polymer is from about 130 nm to about 1.0 microns.

7. The method, according to claim 5, wherein said core stage polymer is formed by polymerizing from about 5% by weight to about 100% by weight, based on the total weight of core stage polymer, of said mono-ethylenically unsaturated monomer containing acid functionality, and from 0% by weight to about 95% by weight, based on the total weight of said core stage polymer, of at least one nonionic mono-ethylenically unsaturated monomer; wherein said shell stage polymer is formed by polymerizing from about 90% by weight to about 99.9% by weight, based on the total weight of shell stage polymer, of at least one nonionic mono-ethylenically unsaturated monomer, and from about 0.1% by weight to about 10% by weight, based on the total weight of shell stage polymer, of an acid-functional mono-ethylenically unsaturated monomer; and wherein said acid-functional mono-ethylenically unsaturated monomer is added to the polymerization of said shell stage polymer throughout the first 50% of the total shell stage monomer feed based on the total weight of the shell stage monomer feed, when the particle size of said core stage polymer is less than about 130 nm.

8. An article prepared by the method of any one of claim 1-5 or 7.

* * * * *